United States Patent [19]

Cadart et al.

[11] 4,212,931
[45] Jul. 15, 1980

[54] ARRANGEMENT COMPRISING A COMPARTMENT AND A CONDUIT

[75] Inventors: François Cadart, Ceyrat; Bernard Pflieger, Chamalieres, both of France

[73] Assignee: Compagnie Generale des Etablissements Michelin, Clermont-Ferrand, France

[21] Appl. No.: 916,482

[22] Filed: Jun. 19, 1978

[30] Foreign Application Priority Data

Jun. 28, 1977 [FR] France .................. 77 20243

[51] Int. Cl.² ............................................. H01M 2/30
[52] U.S. Cl. ................................. 429/104; 29/623.2; 429/181
[58] Field of Search ............... 429/104, 181; 29/623.1, 29/623.2; 220/85 F, 85 SP

[56] References Cited

U.S. PATENT DOCUMENTS

| 3,678,178 | 7/1972 | Hubbauer et al. | 429/181 |
| 3,847,667 | 11/1974 | Werth | 429/104 |
| 4,044,194 | 8/1977 | Evans et al. | 429/104 |
| 4,124,739 | 11/1978 | Sudwerth | 429/104 |

FOREIGN PATENT DOCUMENTS 2044515 2/1971 France .
7305171 10/1969 Japan ................................ 429/104

Primary Examiner—Donald L. Walton
Attorney, Agent, or Firm—Brumbaugh, Graves, Donohue & Raymond

[57] ABSTRACT

An arrangement usable in an electrochemical generator and elsewhere comprises a compartment defined by an envelope in a portion of which there is a recess external to the compartment, said recess surrounding an opening in which a conduit is arranged. The arrangement is characterized by the fact that the conduit comprises a shoulder resting against the bottom of the recess and is further characterized by the fact that a weld material disposed in the recess on the outside of the shoulder forms an assembly between the envelope and the conduit, the shoulder resting against the bottom of the recess either directly or via a thin film of the weld material.

17 Claims, 14 Drawing Figures

ARRANGEMENT COMPRISING A COMPARTMENT AND A CONDUIT

This invention relates to arrangements comprising at least one compartment and at least one conduit which makes it possible to place the compartment in communication with the outside atmosphere. This conduit serves, for instance, to introduce a product into the compartment or to evacuate a product from the compartment. It may also serve, among other uses, to arrange an electron collector in said compartment when the device is an electrochemical device, said conduit being then, for instance, an electrical insulator. This conduit, which may possibly be sealed, is arranged in an opening provided in the envelope of the compartment, one or more weld materials serving to assemble the conduit to the envelope and, possibly, to seal the conduit.

Experience shows that the known assemblies rapidly lead to a loss of tightness and rigidity when the compartment contains a corrosive product, as a result of the attacking of the weld materials by the corrosive product at the place of the weld between the conduit and the envelope or at the place of the seal. This loss of tightness and rigidity interferes with the operation of these arrangements and may raise serious problems of safety as a result of violent reactions between the corrosive product and the ambient air or other products contained in said arrangements.

The object of the invention is to avoid these disadvantages.

Accordingly, the arrangement in accordance with the invention, which comprises at least one compartment defined by an envelope in a portion of which there is at least one recess external to the compartment, said recess surrounding at least one opening in which a conduit is arranged, is characterized by the fact that the conduit comprises at least one shoulder resting against the bottom of the recess and is further characterized by the fact that a weld material disposed at least in the recess on the outside of the shoulder forms an assembly between the envelope and the conduit or conduits corresponding to the recess, the shoulder resting against the bottom of the recess either directly or via a thin film of weld material. The invention also concerns the processes for producing arrangements in accordance with the invention.

The invention will be easily understood by means of the following nonlimitative examples and drawings.

In the drawings, all of which are schematic:

Figure 5:
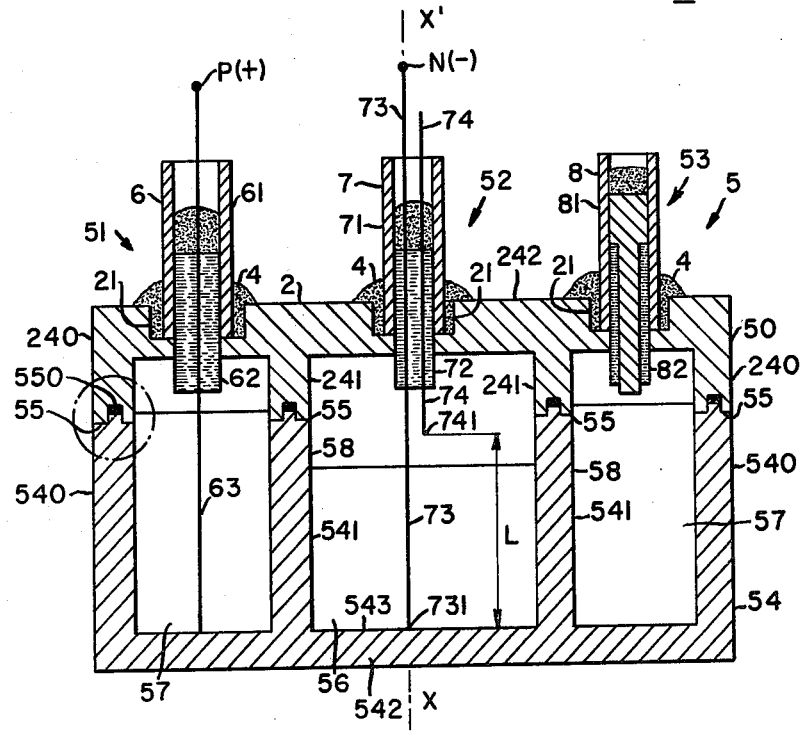
FIG. 5 shows, in cross section, a device in accordance with the invention comprising three assemblies similar to the assembly shown in FIG. 4.
Figure 6:
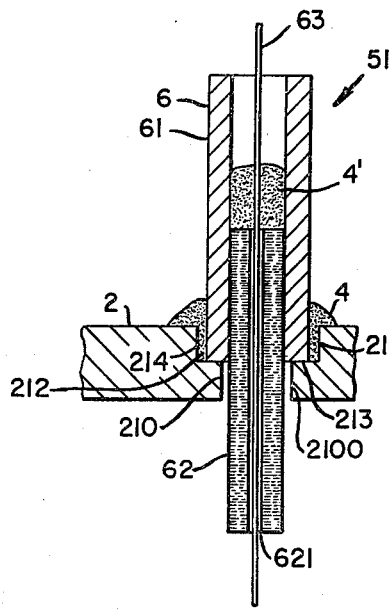
Figure 7:
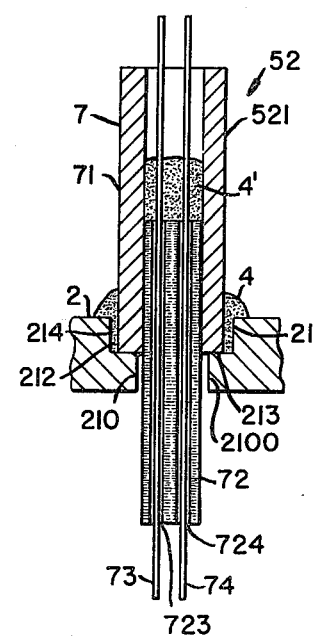
Figure 8:
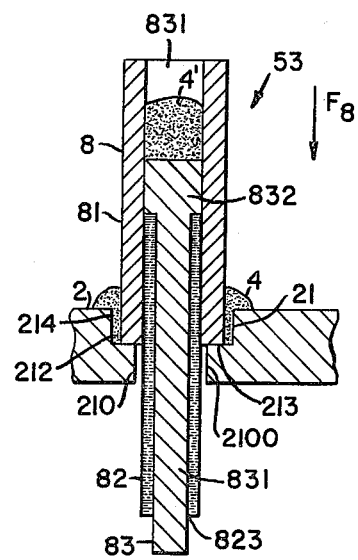
Figure 9:
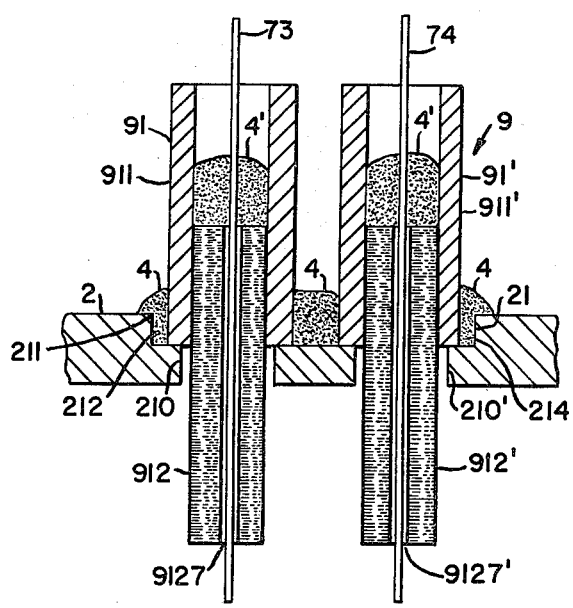
Figure 10:
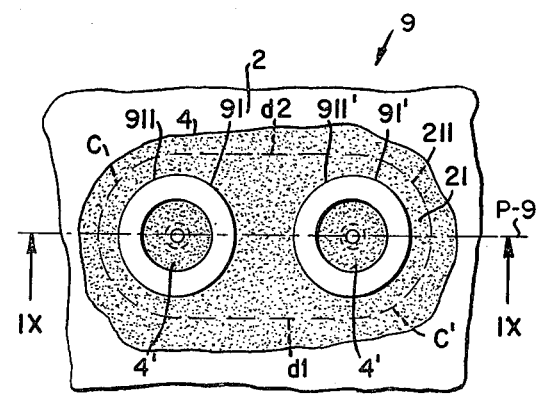
Figure 11:
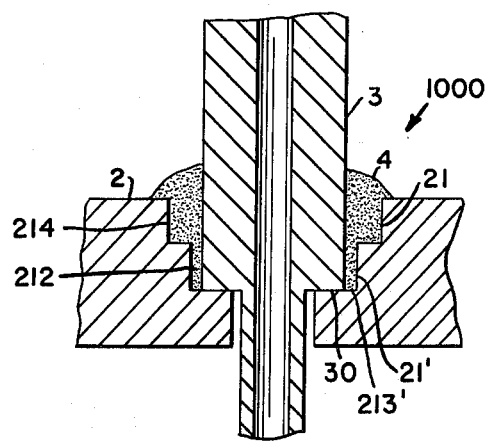
Figure 12:
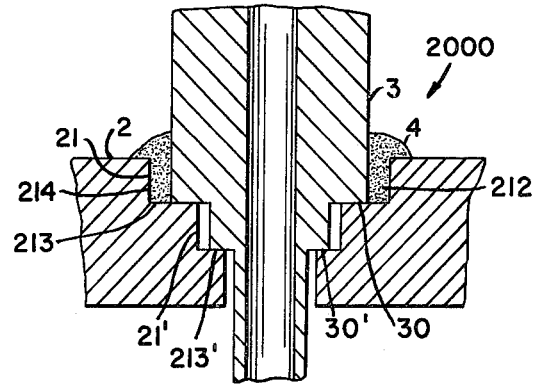
Figure 13:
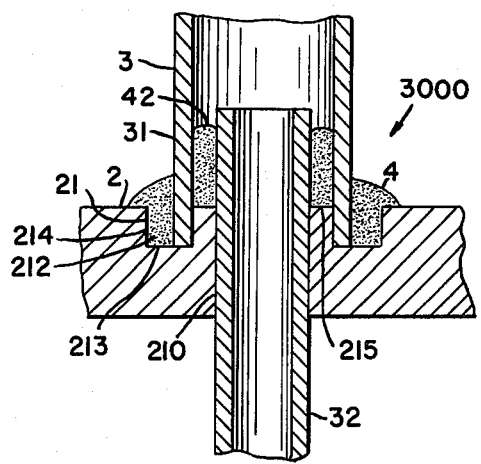
Figure 14:
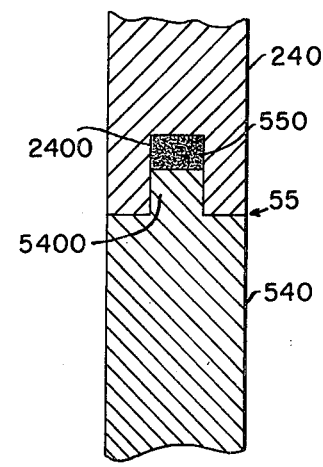

FIGS. 6, 7 and 8 each show in cross section one of the three assemblies of the device shown in FIG. 5;

FIG. 9 shows, in cross section, another assembly according to the invention with two conduits in the same recess;

FIG. 10 shows, in plan view, the assembly which has been shown in FIG. 9;

FIGS. 11, 12 and 13 each show, in cross section, another assembly in accordance with the invention; and FIG. 14 shows, in cross section, an enlarged view of a portion of the device shown in FIG. 5.

Figure 1:
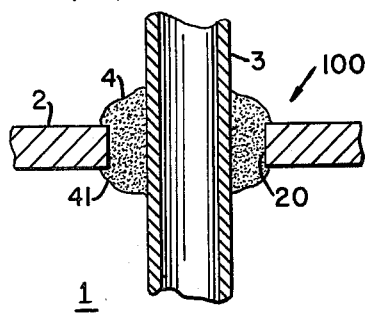
FIGS. 1 and 2 show, in cross section, two known assemblies.

FIG. 1 shows a known assembly 100 between the conduit 3 and the envelope 2 of the compartment 1, the conduit 3 being arranged in the opening 20 of the envelope 2. For the sake of the clarity of the drawing, only the portions of the conduit 3 and envelope 2 which are located in the vicinity of the assembly 100 have been shown, similar limitations applying to FIGS. 2 through 4 and 6 through 13.

The weld material 4 is disposed in the opening 20 in contact with the envelope 2 and the conduit 3. In order to attempt to assure the rigidity and tightness of the assembly 100, it is necessary to use a substantial amount of weld material. The surface 41 of the weld material 4 exposed to the corrosive product (not shown) arranged in the compartment 1 is therefore substantial, which causes the attacking of this weld material 4 by the corrosive product, which may, for instance, be in solid, liquid or gaseous form, resulting in a rapid loss of tightness and of mechanical strength and a change in the physical-chemical properties of the corrosive product located in the compartment 1.

Figure 2:
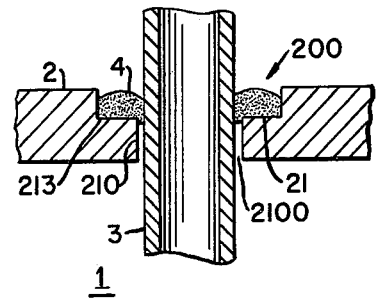

FIG. 2 shows another known assembly 200. This assembly 200 differs from the assembly 100 by the fact that the envelope 2 has a recess 21 on the outside of the compartment 1.

The bottom 213 of this recess 21 is pierced by the opening 210 which extends into the compartment 1. The conduit 3 is arranged in the opening 210.

The weld material 4 is disposed in the recess 21 in contact with the envelope 2 and the conduit 3. This assembly 200, which is substantially more rigid and tighter than the assembly 100, has the drawback, however, that it permits migration of the corrosive product (not shown) in the compartment 1 into the space 2100 which is necessarily present between the conduit 3 and the opening 210 in order to permit expansion of the conduit 3 at the level of the opening 210 if the conduit 3 and the envelope 2 do not have the same coefficients of expansion. Rapid attack of the mass of weld material 4 therefore takes place. If the conduit 3 and the envelope 2 have the same coefficient of expansion, and in particular if they are made of the same material, the space 2100 can be made substantially zero, but at the price of a costly rubbing of the surfaces facing each other.

Furthermore, the centering of the conduit 3 in the opening 210 is difficult in all cases in which an envelope 2 of small thickness is used in order, for instance, to reduce the weight and the cost thereof. As a matter of fact, the depth of the recess 21 and therefore the amount of weld material 4 are then reduced, as well as the thickness of the envelope 2 at the level of the bottom 213 of the recess 21.

This poor centering, in the long run, causes a loss of tightness and rigidity.

French Pat. No. 2,044,515 contemplates providing the opening 210 and the conduit 3 with threads and effecting an injection of adhesive product between the threads by means of a pressure exerted on said product by a shoulder of the conduit. In this way, it is attempted to assure tightness between the threads, on the one hand, and between the shoulder and the bottom of the recess, on the other hand, due to a substantial thickness of adhesive product between the shoulder and said bottom. Such an assembly is expensive to effect and furthermore it does not make it possible to avoid corrosion of the adhesive product when the threads are in contact with an adhesive product, with the loss in tightness which results therefrom.

Figure 3:
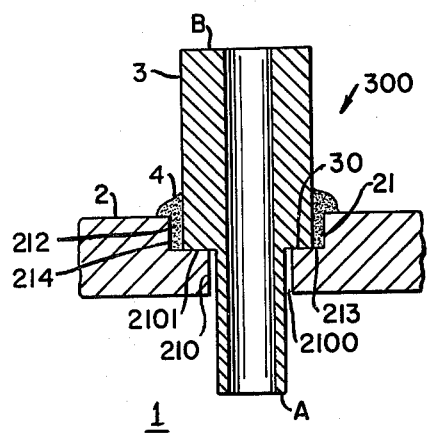
FIG. 3 shows, in cross section, an assembly in accordance with the invention.

FIG. 3 shows an assembly 300 in accordance with the invention.

On the conduit 3 of this assembly 300 there is machined a shoulder 30. This shoulder 30 rests against the bottom 213 of the recess 21. The weld material 4 is disposed in the free space 212 of the recess 21, which free space 212, of annular shape, is located between the conduit 3 and the sidewall 214 of said recess 21, that is to say on the outside of the shoulder 30. The weld material 4 is thus in contact with the envelope 2 and the conduit 3, the amount of this weld material being selected so as to permit good rigidity and good tightness. The presence of the shoulder 30 in contact with the bottom 213 permits good centering of the conduit 3 in the opening 210 which passes through the bottom 213.

Furthermore, the corrosive product (not shown) which is disposed in the compartment 1 can only reach the mass of weld material 4 on the outside of the shoulder 30 with great difficulty, because the space 2101 between the shoulder 30 and the bottom 213 can be made as small as desired since this space 2101 is not necessary in order to permit the expansion of the conduit 3 and of the envelope 2 when the conduit 3 is free to expand or contract at its ends A and B. A machining of the shoulder 30 and of the bottom 213 therefore permits practically perfect contact between these two parts and therefore guarantees satisfactory tightness and mechanical strength of the assembly 300, whatever its period of use, even if the thickness of the envelope 2 and the amount of material 4 are slight. A thin film of weld material 4 may be present without disadvantage in the space 2101, for instance, if the machining of the shoulder 30 and of the bottom 213 is not perfect, or if aspiration of the weld material 4 is effected through the conduit 3 during the welding operation, the shoulder 30 then resting on the bottom 213 via said film instead of resting directly on it.

The arrangements of the assembly 300 which have been previously described permit good rigidity and good tightness of this assembly even if the opening 210 and the conduit 3 are unthreaded.

Figure 4:
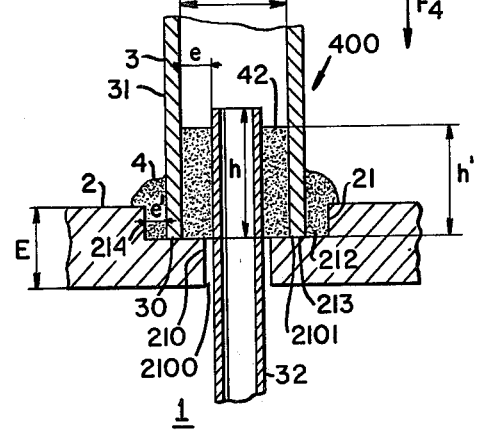
FIG. 4 shows, in cross section, an assembly which is a preferred embodiment of the invention, the conduit of this assembly being formed of two sheathings.

FIG. 4 shows an assembly 400 which is a preferred embodiment of the invention. The conduit 3 is formed of an outer sheathing 31 and of an inner sheathing 32. The inner sheathing 32 is fitted within the outer sheathing 31. The outer sheathing 31 rests against the bottom 213 of the recess 21 at one of its ends, which thus constitutes the shoulder 30 which has been described above. By way of example, the sheathings 31 and 32 are directed vertically, the bottom 213 being located below the outer sheathing 31.

The inner sheathing 32 is disposed in the opening 210. This arrangement has the advantage of not requiring machining for the production of the shoulder 30, resulting in a lower cost, since such machining may be difficult to effect. The assembly 400 can be produced in very simple manner by pushing the inner sheathing 32 into the outer sheathing 31 over a height "h" and causing the inner sheathing 32 to penetrate into the compartment 1 in the direction indicated by the arrow F4. The weld material 4 is then placed within the free space 212 of the recess 21, this free space 212 of annular shape being located between the outer sheathing 31 and the sidewall 214 of the recess 21. The weld material 4 is thus in contact with the envelope 2 and the outer sheathing 31, the weld being effected, for instance, by causing the weld material 4 to melt or by sintering it.

When the sheathings 31 and 32 have practically the same coefficient of expansion, for instance, when they are made of the same material, the space "e" between these sheathings may possibly be made as small as desired.

However, it is more advantageous, whatever the materials of which these sheathings consist, to bond them together by a weld material, for instance, the weld material 4 itself. This can be done, for instance, by effecting an aspirating of this weld material 4 during the welding operation. One then obtains a thin film of weld material 4 in the space 2101 between the shoulder 30 of the outer sheathing 31 and the bottom 213 of the recess 21, which film is not harmful to the tightness or mechanical strength, and a sleeve 42 of the weld material 4 between the sheathings 31 and 32 over a height "h'" which is less than or equal to the height "h" so that the weld material 4 does not penetrate into the inside of the sheathing 32, the height "h'" and the thickness "e" of the sleeve 42 being selected in such a manner as to have a good weld between the sheathings 31 and 32 and a good resistance of the sleeve 42 to attack by the corrosive product (not shown) contained in the compartment 1. The thickness "e'" of the weld material 4 in the free space 212 corresponds to the distance between the outer sheathing 31 and the sidewall 214.

By way of example, the thin film of weld material 4 in the space 2101 has a thickness at most equal to 0.05 mm, the height "h'" is at least equal to 1 cm, the thickness "e" is at most equal to 0.1 mm, the thickness "e'" is at least equal to 0.2 mm, these values being understood for an inside diameter D of the outer sheathing 31 of between 0.5 and 2 cm, the thickness E of the envelope 2 being on the order of 0.5 cm, the recess 21 extending down through about half of this thickness E, and the sheathings 31 and 32 being cylinders of revolution.

It may happen that upon the aspiration, a small amount of the weld material 4 penetrates into the space 2100, if any, between the inner sheathing 32 and the opening 210, without this being harmful to the tightness or the mechanical strength of the assembly 400.

It is obvious that the conduit 3 of the arrangement 300 and the inner sheathing 32 of the arrangement 400 may possibly be made of a material having the same coefficient of expansion as the envelope 2, which makes it possible for the space 2100 to be as small as desired.

FIG. 5 shows another device in accordance with the invention comprising the assemblies 51, 52 and 53, as shown in detail in FIGS. 6, 7 and 8, respectively.

This device 5 consists of a cell 50 comprising an upper part 2 referred to as the "cover" and a lower part 54 referred to as the "body." The body 54 has in general the shape of a body of revolution around the vertical axis XX' located in the plane of FIG. 5. This body 54 has two cylindrical walls 540 and 541 and a bottom 542 of flat shape, the wall 541 being located towards the inside of the wall 540. The cover 2 has two walls 240, 241, these walls being cylindrical surfaces of revolution around the axis XX', and a top 242, the wall 241 being located on the inside of the wall 240. The walls 540 and 541 of the body 54 are connected to the walls 240 and 241, respectively, of the cover 2 by welds 55 formed by the weld material 550. The body 54 and the cover 2 define two compartments, namely the central compartment 56 and the annular compartment 57.

By way of example, the device 5 is an electrochemical current generator of the sodium-sulfur type, the central compartment 56 being the anode compartment and the annular compartment 57 being the cathode compartment. The wall 58 formed of the inner cylinders 241 and 541 therefore separates the compartments 56 and 57 and is made at least in part of a material which conducts $Na^+$ ions.

This result can be obtained, for instance, by making the cover 2 and the body 54 entirely of such a material, in particular of $\beta$ and/or $\beta''$ sodium-aluminum oxide, said aluminum oxide possibly containing one or more additives, for instance, magnesium or lithium oxide.

It is obvious that other solutions are possible, in particular the use of such a sodium-aluminum oxide solely for the cylinder 541, the rest of the body 54 and the cover 2 being then made of one or more other materials, for instance, metallic or inorganic.

The cover 2 which therefore in part constitutes the envelope defining the compartments 56 and 57 is provided with three assemblies 51, 52 and 53 in accordance with the invention made in a manner similar to the assembly 400 shown in FIG. 4, the reference numbers 2, 4, 21, 210, 212, 213, 214 and 2100 having the same meaning as in FIG. 4.

The conduit 6 (formed of the outer sheathing 61 and the inner sheathing 62), the conduit 7 (formed of the outer sheathing 71 and the inner sheathing 72), and the conduit 8 (formed of the outer sheathing 81 and the inner sheathing 82) play, respectively, the same role as the pair of sheathings 31, 32 of the assembly 400, the sheathings 61, 62, 71, 72, 81, 82 being, for instance, cylinders of revolution.

The inner sheathing 62 of the conduit 6 is pierced over its length by a channel 621, of small inside cross section, parallel to the axis (not shown) of the sheathing 62. A wire 63, for instance, of molybdenum, is arranged in this channel 621. The wire 63 penetrates practically throughout the entire height of the cathode compartment 57 and thus constitutes the cathode collector.

The end of the wire 63 which is located outside of the cathode compartment 57 constitutes the positive terminal P of the generator 5. The inner sheathing 72 of the conduit 7 is pierced over its length by two channels 723 and 724 of small inside cross section, parallel to the axis (not shown) of the outer sheathing 71. These channels 723 and 724 permit the passage of the wires 73 and 74, respectively, consisting, for instance, of molybdenum. The wire 73 penetrates into the anode compartment 56, constituting the anode collector, the end 731 of this wire 73 which is located in the anode compartment 56 touching the bottom 543 of the anode compartment 56. The end of this wire 73 which is located outside of the anode compartment 56 constitutes the negative terminal N of the generator 5. The wire 74 penetrates only into the upper portion of the anode compartment 56, the end 741 of this wire 74 which is located within the anode compartment 56 being situated at a distance L from the bottom 543 of said compartment. The purpose of this wire 74 will be explained further below.

The inner sheathing 82 of the conduit 8 is pierced over its length by a channel 823 whose cross section is substantially greater than that of the channels 621, 723, and 724, the channel 823 being parallel to the axis (not shown) of the outer sheathing 81.

A plug 83 fits in this channel 823. The sheathings of each conduit, 6, 7 and 8, are advantageously made of the same material, for instance, a ceramic, the plug 83 being then preferably made of the same material as the sheathings 81 and 82 or of a material which has practically the same coefficient of expansion as said sheathings.

As previously indicated, this solution has the advantage of permitting the space "e" (not shown in FIGS. 5 to 8) between the sheathings of each conduit or between the sheathings 81, 82, on the one hand, and the plug 83, on the other hand, to be substantially reduced in size.

The sheathings 61, 62, 71, 72 may advantageously be electrical insulators, these sheathings being made, for instance, of $\alpha$ alumina.

The assembling of the generator is, for instance, effected in the following manner:

An electron conductive material, for instance, a graphite felt (not shown), is placed in the annular space present between the walls 540 and 541, this space (not bearing any reference number) subsequently becoming a part of the cathode compartment 57. The inner sheathings 62, 72 and 82 are placed in the outer sheathings 61, 71 and 81, respectively. The three conduits 6, 7 and 8 are placed in the three corresponding recesses 21 of the cover 2, the outer sheathings 61, 71 and 81 resting against the bottoms 213 of said recesses, and the openings 210 permitting the penetration of the inner sheathings 62, 72 and 82 through the cover 2.

The cover 2 and the body 54 are assembled, the inner sheathings 62 and 82 thus penetrating into the upper portion of the cathode compartment 57, and the inner sheathing 72 thus penetrating into the upper portion of the anode compartment 56.

The weld material 4 is placed in the three free spaces 212 of the recesses 21 in contact, on the one hand, with the cover 2 and, on the other hand, with the outer sheathings 61, 71 and 81.

The weld material 4 is caused to melt and a vacuum is produced in the compartments 56 and 57 through the outer sheathings 61, 71 and 81.

In this way, there is caused by aspiration the formation of thin layers of weld material 4 between each outer sheathing 61, 71 and 81 and the bottom 213 of the recess 21 where it is located, as well as the formation of a sleeve of slight thickness of weld material 4 between the outer sheathing and the inner sheathing of each conduit 6, 7 and 8, in a manner similar to what has been described above in connection with the assembly 400.

For clearness of the drawing, these films and sleeves have not been shown in FIGS. 5 to 8. The welds 55 can possibly be effected at the same time as the welds of the sheathings of the conduits 6, 7 and 8. The wires 73 and 74 are then introduced into the channels 723 and 724.

A sealing material arranged above the inner sheathing 72 makes it possible to obtain the sealing plug 4' of the conduit 7. This sealing material may be capable of penetrating into the narrow spaces between the wires 73 and 74 and the inner sheathing 72, which further improves the tightness and the mechanical strength.

Sulfur vapors are then introduced into the cathode compartment 57 through the channel 823, the apsirating of these vapors taking place through the channel 621. The sulfur thus condenses in and around the graphite felt, which is arranged in the cathode compartment 57, which is then maintained at low temperature.

A sealing plug 4' is then produced above the inner sheathing 62 after having introduced the wire 63 therein, this sealing plug 4' being made in a manner similar to the sealing plug 4' of the assembly 52 which was previously described.

The plugging of the assembly 53 is effected by the plug 83, the body 831 of which has the shape of a conical frustum and the head 832 of which is of cylindrical shape, the conical frustum 831 widening towards the head 832. The body 831 is force-fitted in the channel 823 parallel to the arrow F8, the head 832 being then in contact with the upper part of the inner sheathing 82. This arrangement permits good contact of the plug 83 with the sheathings 81 and 82.

The tightness and mechanical strength of the assembly 53 are further improved by arranging a sealing plug 4' above the head 832, the material of which sealing plug can advantageously enter into the small spaces between the plug 83, on the one hand, and the sheathings 81 and 82, on the other hand.

The weld materials 4 and 550 as well as the sealing materials 4' may possibly be of identical nature, for instance, of a base of borosilicate glass.

The anode compartment 56 is then filled with pure sodium by electrolysis of a sodium salt, for instance, sodium nitrate, arranged on the outside of the generator 5, the bottom 543 of the compartment 56 then serving as solid electrolyte and the wire 73 which touches the bottom 543 serving as electrode. The wire 74 makes it possible to regulate the maximum level of sodium in the anode compartment 56.

The electrolysis takes place on basis of an external source of current (not shown).

The discharge of the generator 5 into an electric circuit (not shown) located between the terminals P and N then takes place in conventional manner at a temperature on the order of 350° C. to 400° C. The liquid sodium, which is the anode-active material, oxidizes forming $Na^+$ ions which migrate from the anode compartment 56 towards the cathode compartment 57 through the wall 58.

The liquid sulfur, which is the cathode-active material, is reduced yielding liquid polysulfides which also become cathode-active materials, with enrichment in sodium.

The recharging is effected in known manner by applying an electric voltage to the terminals P and N so as to effect the electrolysis of the polysulfides contained in the compartment 57, the compartment 56 then receiving the sodium. When the free surface of this liquid sodium reaches the end 741, called the high level, of the wire 74, the recharging automatically stops, due to an electric triggering device (not shown).

It is obvious that the cathode-active material could be introduced into the compartment 57 directly in the form of sodium polysulfides, the sodium being then introduced into the compartment 56 either directly or by electrolysis of these polysulfides.

The assemblies 51, 52 and 53 in accordance with the invention permit prolonged and repeated operation of the generator, without loss of tightness and without mechanical break, as a result of the absence of attack in the mass of weld and sealing materials 4 and 4', respectively, by corrosive products (sodium and polysulfides).

The welds 55 are preferably produced in such a manner that the mass of the weld material 550 is not in contact either with the sodium or with the polysulfides. This is achieved, for instance, in accordance with FIG. 14, which shows a wall portion 240 of the cover 2 connected by the weld 55 to a portion of the wall 540 of the body 54, FIG. 14 being an enlarged view of the portion of the generator 5 which is surrounded by a circle in FIG. 5, the weld 55 between the walls 241 and 541 being analogous.

The protuberance 5400 of the wall 540 is arranged in the groove 2400 of the wall 240, this protuberance and this groove being, for instance, of cylindrical shape. The distance between the facing vertical faces of the groove 2400 and the protuberance 5400 is practically zero and the weld material 550 is arranged in the bottom of the groove 2400. It goes without saying that one can contemplate welds 55 such that the entire upper end of the wall 540 is arranged in the groove 2400 or such that the groove 2400 is made in the wall 540. One can furthermore contemplate two or more grooves arranged in the wall 240 and/or in the wall 540. It is obvious that one can contemplate other arrangements in addition to the one which has been described in connection with the compartments 56 and 57, for instance, an arrangement such that the cathode compartment 57 is located at the center of the cell 50, the anode compartment 56 then surrounding the cathode compartment 57.

One can also contemplate a generator which comprises a plurality of cells, each of said cells having possibly a plurality of anode and/or cathode compartments.

The assemblies in accordance with the invention may comprise several conduits arranged in the openings of one and the same recess. FIGS. 9 and 10 show such an assembly 9, used, for instance, in place of the assembly 52 in the generator 5. This assembly 9 comprises the recess 21 whose periphery 211 (shown in dashed line in FIG. 10) has substantially the shape of two semicircles C and C' connected by straight-line segments $d_1$ and $d_2$. The recess 21 is pierced with two openings 210 and 210' which are cylindrical openings of revolution, the axes (not shown) of these openings being located in the plane P-9, which is the plane of symmetry for the assembly 9 and is also the plane of FIG. 9. In the openings 210 and 210' of, for instance, identical diameter, there are arranged two identical conduits 91 and 91' formed of the outer sheathings 911 and 911' and the inner sheathings 912 and 912', respectively, these sheathings being cylinders of revolution. The inner sheathings 912 and 912' are pierced by the channels 9127 and 9127', respectively, which are parallel to the axes (not shown) of said sheathings. The anode collector 73 is located in the channel 9127 and the wire 74 is within the channel 9127'. The weld material 4 is placed in the free space 212 of the recess 21 which is located between the outer sheathings 911, 911' and the sidewall 214 of said recess. One thus assures the welding of the outer sheathings 911 and 911' to each other and to the outer envelope 2. The sealing material 4' assures tightness at the upper portion of the inner sheathings 912 and 912', as in the assemblies 51 and 52.

Such an assembly 9 can be preferred to the assembly 52, since each of the inner sheathings 912 and 912' has only one inner channel, which is easier to produce than the channels 723 and 724 of the inner sheathing 72.

Furthermore, such an assembly makes it possible to use two or more collectors in the same compartment, by having two or more openings in each recess 21, said multi-wire outlet making it possible to lower the electrical resistance of the corresponding compartment without having to increase the diameter of each collector wire, the corresponding recess 21 being capable of being of any shape, for instance, oval or circular.

One can, of course, contemplate other assemblies in accordance with the invention, as is evident from the following nonlimitative embodiments.

FIG. 11 shows an assembly 1000 whose envelope 2 has a recess 21 which contains a groove 21' surrounding the shoulder 30 of the conduit 3. This shoulder 30 rests against the bottom 213' of the groove 21'.

FIG. 12 shows an assembly 2000 whose conduit 3 has two shoulders 30 and 30'. The shoulder 30 rests against the bottom 213 of the recess 21, while the shoulder 30' rests against the bottom 213' of the groove 21' which constitutes a portion of the recess 21.

It goes without saying that in the arrangements 1000 and 2000 the conduit 3 may be formed of two sheathings.

One can, furthermore, contemplate conduits having more than two shoulders, the corresponding recess 21 then being capable of having more than one groove 21'.

FIG. 13 shows an assembly 3000 whose conduit 3 is formed of two sheathings 31 and 32 separated by a ring 215 of the envelope 2. The annular recess 21 then surrounds the ring 215 and the opening 210 in which the inner sheathing 32 is contained, the outer sheathing 31 resting against the bottom 213 of the annular recess 21. The sheathings 31 and 32 are then necessarily assembled by a sleeve 42 of weld material.

The assemblies 1000, 2000 and 3000 can permit a better centering of the conduit 3 and improve the mechanical strength and tightness, but they require more difficult machinings than the other assemblies which have been previously described.

The weld material 4 may possibly fill the free spaces 212 in the assemblies in accordance with the invention or even extend out of said spaces, as shown in FIGS. 3 to 13, which further improves the strength and the tightness of these assemblies.

Of course, the invention is not limited to the embodiments described above, on basis of which one can contemplate other methods and embodiments without thereby going beyond the scope of the invention.

Thus, for instance, the conduits of the assemblies in accordance with the invention may possibly each have more than two sheathings located one within the other, these sheathings being in particular coaxial and the shoulder being formed at one end of at least one sheathing, referred to as the outer sheathing, the sheathing or sheathings arranged in the opening being called the inner sheathings.

What is claimed is:

1. Arrangement comprising at least one compartment defined by an envelope in a portion of which there is at least one recess external to the compartment, said recess surrounding at least one opening in which a conduit is arranged, characterized by the fact that the conduit is constituted of at least one outer sheathing and of at least one inner sheathing, the inner sheathing having at least one channel over its length and fitting within the outer sheathing, one end of the outer sheathing constituting a shoulder resting against the bottom of the recess and the inner sheathing being arranged in the opening, and further characterized by the fact that a weld material disposed at least in the recess on the outside of the shoulder forms an assembly between the envelope and the conduit or conduits corresponding to the recess, the shoulder resting against the bottom of the recess either directly or via a thin film of the weld material.

2. Arrangement according to claim 1, characterized by the fact that the sheathings constituting the conduit are made of the same material or of materials having practically the same coefficient of expansion.

3. Arrangement according to claim 1 or claim 2, characterized by the fact that a metal wire is arranged in said channel, the sheathings being electrical insulators.

4. Arrangement according to claim 1 or claim 2, characterized by the fact that the inside of the outer sheathing is closed by a part called a plug which comprises a body arranged in the channel of the inner sheathing and a head located outside of said channel.

5. Arrangement according to claim 4, characterized by the fact that the body has the shape of a conical frustum, the conical frustum widening towards the head.

6. Arrangement according to claim 4, characterized by the fact that the plug is made of the same material as the sheathings or of a material having practically the same coefficient of expansion.

7. Arrangement according to claim 1, characterized by the fact that the conduit is sealed with a sealing material.

8. Arrangement according to claim 1, characterized by the fact that the sheathings which constitute the conduit are connected by a sleeve of a weld material.

9. Arrangement according to claim 1, characterized by the fact that the recess has at least one groove, a shoulder of the conduit resting against the bottom of said groove.

10. Arrangement according to claim 1, characterized by the fact that a ring of said portion of the envelope is arranged between the sheathings constituting the conduit.

11. Arrangement according to claim 1, characterized by the fact that the envelope comprises at least two parts connected by a weld material arranged in at least one groove provided in at least one of said parts.

12. Arrangement according to claim 1, characterized by the fact that the opening and the conduit are without threads.

13. Arrangement according to claim 1, characterized by the fact that it is an electrochemical generator of electric current.

14. Electrochemical generator according to claim 13, characterized by the fact that the anode-active material is sodium and the cathode-active material is sulfur and/or at least a sodium polysulfide, each of said active materials being contained in at least one compartment, and further characterized by the fact that the envelope of at least one of these compartments is made at least in part of $\beta$ and/or $\beta''$ sodium aluminum oxide.

15. Electrochemical generator according to claim 13, characterized by the fact that the sheathings consist of $\alpha$ alumina.

16. Arrangement according to claim 8, characterized by the fact that the weld material in the recess and the weld material connecting the sheathings have the same composition.

17. Process for making an arrangement comprising at least one compartment defined by an envelope in a portion of which there is at least one recess external to the compartment, said recess surrounding at least one opening in which a conduit is arranged, characterized by the following steps:

(a) forming the conduit of at least one outer sheathing and of at least one inner sheathing, the inner sheathing being provided with at least one channel over its length;

(b) pushing the inner sheathing into the outer sheathing over a height "h" and disposing the inner sheathing in the opening;
(c) resting the outer sheathing against the bottom of the recess at one of its ends which constitutes a shoulder;
(d) disposing a weld material at least in the recess on the outside of the shoulder in order to form an assembly between the envelope and the conduit or conduits corresponding to the recess;
(e) obtaining a sleeve of weld material between the inner sheathing and the outer sheathing by effecting an aspirating of the weld material, the height "h'" of said sleeve being less than or equal to the height "h" of the inner sheathing in the outer sheathing; and
(f) resting the shoulder against the bottom of the recess either directly or via a thin film of the weld material.

* * * * *